_United States Patent Office_

3,297,491
Patented Jan. 10, 1967

3,297,491
MICROSCOPE STAGE WITH TEMPERATURE
MAINTAINING MEANS
Evgeny Andreevich Kolenko, ul. Academica Pavlova 14,
Apt. 26, Leningrad, U.S.S.R.
Filed Sept. 14, 1961, Ser. No. 139,042
3 Claims. (Cl. 136—204)

The present invention relates to a stage for microscopes.

The present invention relates particularly to a design of a microscope stage in which the stage is provided with a thermolectric pile for cooling or heating the slides disposed thereon.

The aim of the present invention is to create a simple, compact design of microscope stage in which the main stage parts are also the components of the thermoelectric pile; the design further permitting the stage to be used in any type of microscope.

The employment of thermoelectric piles for cooling or heating in various types of units and apparatus is known to have been disclosed earlier and is hence not broadly an object of the present invention.

What is claimed as novel in the present invention is a microscope stage in which the thermoelements of the thermoelectric pile used for cooling or heating the slides are positioned around an opening provided in the stage to permit passage of light from the light source of the instrument, and are so arranged that the current-conducting plates which join the thermoelements together form the base of the stage and a surface for receiving and supporting the slides.

Such design of the stage makes it compact, simple and reduces the number of component parts to a minimum.

The second distinctive characteristic of this invention consists in that the current-conducting plates which form the base of the stage, are provided with passages for the flow of a cooling medium, e.g. water, serving to conduct heat away from the hot junctions of the thermoelectric pile.

Another characteristic of the present invention consists in that all of the stage parts are embedded in epoxide resin or a similar material so as to provide the unit with the necessary strength.

Further aims and advantages of the present invention will be apparent from the following description and attached drawings in which are shown two design modifications of a microscope stage in accordance with this invention.

Figure 1:
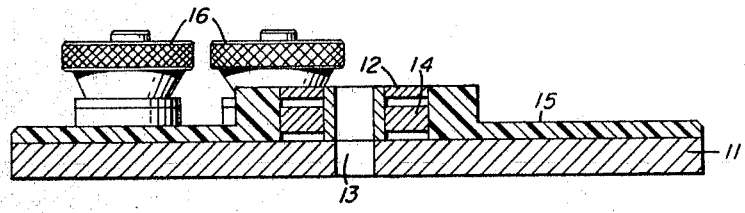
FIG. 1 is a sectional view of a stage according to the first design modification.
Figure 2:
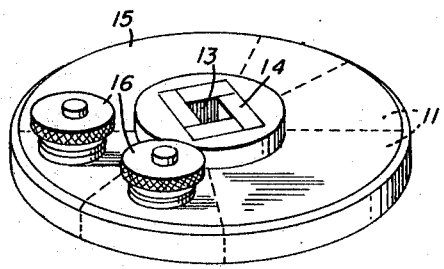
FIG. 2 is a perspective view of the stage shown in FIG. 1.

The microscope stage shown in FIGS. 1 and 2 is intended for examining obects by transmitted light at temperatures ranging from —7 to +60° C.

The base of the stage is formed by five sector-shaped current-conducting plate 1 which interconnect thermoelements 2, the latter forming a closed quadrangle. Within the closed quadrangle formed by the above thermoelements is a through opening 3, provided for passage of light from the light source of the unit to the object placed on the stage.

When the stage is operated in a cooled condition, the sector-shaped current-conducting plates 1 serve to transfer of the heat from the hot junctions of the thermoelements 2 to the body of the microscope and into the ambient air.

Current-conducting plates 4 are located on top of the said thermoelements 2 and from a surface on which the glass slide with the object to be examined is placed.

Cooling is accomplished by the cold upper current-conducting plates 4 of the thermoelectric pile which remove the heat from the object under investigation through the slide glass.

All of the stage parts are embedded in epoxide resin 5 or a like material to provide the stage with the necessary strength.

Power is fed to the thermoelectric pile through two terminals 6, connected to two of the sector-shaped current-conducting plates 1.

Figure 3:
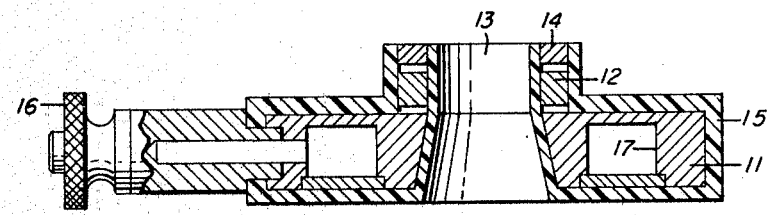
FIG. 3 is a sectional view of a stage according to the second design modification.
Figure 4:
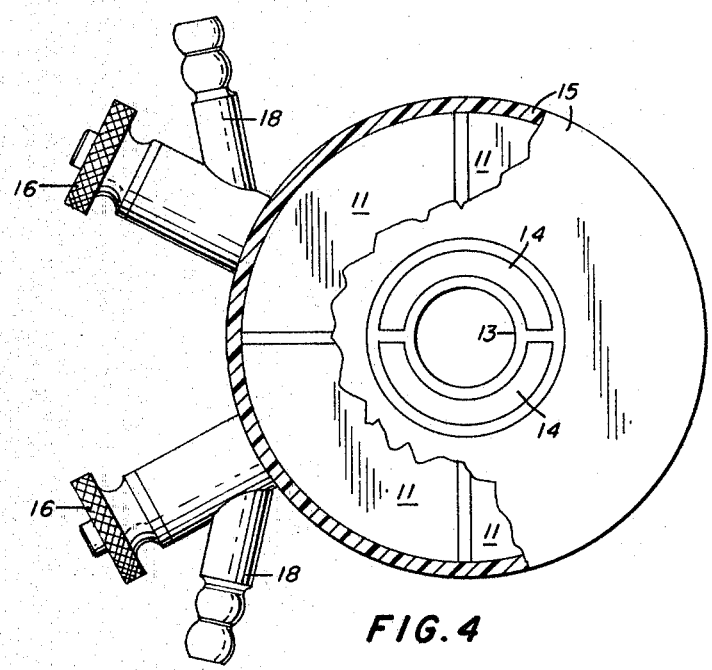
FIG. 4 is a top plan view, partially in section of the stage shown in FIG. 3.
Figure 5:
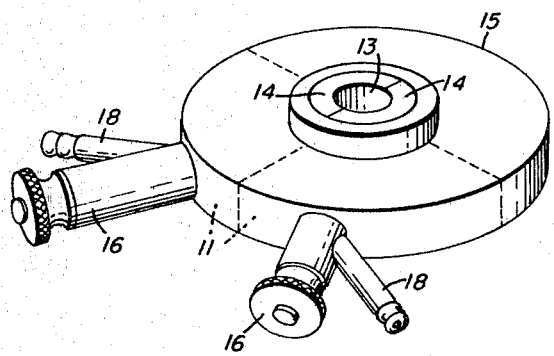
FIG. 5 is a perspective view of the stage shown in FIG. 3.

The modified form of stage shown in FIGS. 3–5 allows microscopic investigations to be carried out by means of transmitted light with the specimens cooled down to a temperature of —25° C.

In distinction ot the above-described first form of stage, in which the heat is transferred from the hot junctions of the thermoelectric pile by convection into the ambient air, the second design modification of the stage is characterized in that cooling of the hot junctions of the thermoelectric pile is effected by the flow of a cooling medium, e.g. water.

Passages 7 through which the cooling medium is allowed to flow are provided in hot current-conducting plates 11 which form the base of the stage. Thermoelectric pile 12 is mounted on current-conducting plates 11, the cold junctions of this thermoelectric pile 12 being connected to two semi-circular current-conducting plates 14, in the center of which a through opening 13 is provided for passage of light from the light source of the microscope. The slide containing the object to be examined is placed on the current-conducting plates 14.

Power for the thermoelectric pile is supplied through terminals 16, which are provided with connection outlets 18 for inlet and discharge of the cooling medium, e.g. water.

All the stage parts are imbedded in epoxide resin 15, or a like material, to provide the stage with adequate mechanical strength.

Changeover from a cooling operation to a heating operation is effected by a change in direction of the current supplied to the thermoelectric pile 12.

The degree of heating or cooling of the object under examination on the stage, is regulated by means of a rheostat connected in series with the thermoelectric pile and the source of direct current, or by an autotransformer connected to the input of the rectifier.

The power consumption of the stage is 2–3 watts at a current of 14–20 amperes.

Overall dimensions: height—10–15 mm., diameter—50–70 mm., weight—110–160 gr.

What is claimed is:

1. A microscope stage for supporting a microscopic slide and for maintaining said slide at a predetermined temperature, said stage comprising a base provided by a current conducting plate having a central opening, said plate having passages for conducting a liquid heat transfer medium therethrough and inlet and outlet fittings connected to said passages, a thermoelectric pile comprising a plurality of thermoelements disposed on said plate surrounding said opening, said thermoelements being joined to said plate, a plurality of current conducting plates disposed on the upper surface of said thermoelements surrounding said opening and joined thereto, said last named plates providing a supporting surface for said slide, and electrical supply terminals on said first mentioned current conducting plate to provide power for operating said pile to cool said slide to said predetermined temperature.

2. A microscope stage as defined in claim 1, in which said inlet and outlet fittings are combined with said terminals.

3. A microscope stage as defined in claim 2, in which all of the parts thereof are imbedded in an epoxide resin to provide mechanical strength.

References Cited by the Examiner

UNITED STATES PATENTS

| 2,228,906 | 1/1941 | Bowen | 88—40 |
| 2,232,354 | 2/1941 | Weygand | 88—40 |
| 2,922,284 | 1/1960 | Danielson et al. | 62—3 |
| 3,141,239 | 7/1964 | Meyer et al. | 62—3 X |

WINSTON A. DOUGLAS, *Primary Examiner.*

EMILE G. ANDERSON, ALLEN B. CURTIS,
*Examiners.*

D. J. HOFFMAN, *Assistant Examiner.*